US008469049B2

(12) United States Patent  (10) Patent No.: US 8,469,049 B2
Garceau  (45) Date of Patent: Jun. 25, 2013

(54) TERMINATION VALVE EXTENSION

(75) Inventor: Bernard F. Garceau, Vandalia, MI (US)

(73) Assignee: Norco Industries, Inc., Compton, CA (US)

( * ) Notice: Subject to any disclaimer, the term of this patent is extended or adjusted under 35 U.S.C. 154(b) by 406 days.

(21) Appl. No.: 12/956,221

(22) Filed: Nov. 30, 2010

(65) Prior Publication Data

US 2011/0132485 A1  Jun. 9, 2011

Related U.S. Application Data

(60) Provisional application No. 61/265,353, filed on Nov. 30, 2009.

(51) Int. Cl.
    *B60P 3/30* (2006.01)
(52) U.S. Cl.
    USPC ............ 137/355.12; 137/899; 137/355.16; 137/615; 138/107
(58) Field of Classification Search
    USPC ........ 137/355.12, 355.16, 615, 899; 138/106, 138/114, 120, 155, 107; 285/61–63, 283; 248/49, 75, 83, 329
    See application file for complete search history.

(56) References Cited

U.S. PATENT DOCUMENTS

| | | | |
|---|---|---|---|
| 1,359,127 A * | 11/1920 | Tedder | 248/49 |
| 3,496,959 A * | 2/1970 | Wolfe et al. | 137/899 |
| 3,712,331 A * | 1/1973 | Otto | 137/355.16 |
| 3,730,228 A | 5/1973 | Gibbs | |
| 3,811,462 A * | 5/1974 | Feliz | 137/899 |
| 4,133,347 A | 1/1979 | Mercer | |
| 4,223,702 A | 9/1980 | Cook | |
| 4,228,978 A * | 10/1980 | Rand | 248/49 |
| 4,231,595 A | 11/1980 | Knutsen | |
| 4,541,327 A * | 9/1985 | Lundstrom | 248/75 |
| 4,643,229 A * | 2/1987 | Hickin | 138/110 |
| 4,650,224 A * | 3/1987 | Smith | 137/899 |
| 4,712,755 A * | 12/1987 | Robbins et al. | 248/49 |
| 4,758,027 A * | 7/1988 | Todd | 285/307 |
| 4,774,979 A * | 10/1988 | McKeon et al. | 137/615 |
| 4,779,650 A | 10/1988 | Sargent | |
| 4,796,926 A * | 1/1989 | Rapsilver | 285/253 |
| 4,854,349 A * | 8/1989 | Foreman | 137/899 |
| 5,023,959 A * | 6/1991 | Mercer | 137/899 |
| 5,033,702 A * | 7/1991 | Robbins | 248/83 |
| 5,067,679 A * | 11/1991 | Courtney | 248/49 |
| 5,323,813 A | 6/1994 | Barrett | |
| 5,431,455 A * | 7/1995 | Seely | 285/61 |
| 5,653,262 A * | 8/1997 | Hanemaayer | 137/899 |

(Continued)

*Primary Examiner* — Craig Schneider
*Assistant Examiner* — Craig J Price
(74) *Attorney, Agent, or Firm* — Hahn, Loeser & Parks, LLP

(57) ABSTRACT

A discharge extension assembly includes a main tube having at least first and second ends. The discharge extension assembly further includes at least one extension tube configured to telescope from within the main tube. The main tube and the at least one extension tube may include a plurality of collars that are configured to limit overextension of the at least one extension tube from the main tube. A first bracket is configured to mount to the first end of the main tube. A hinge assembly is configured to pivot the main tube and the at least one extension tube. The hinge assembly may include a stop and a sleeve slidably engaged with a shaft. The stop, the sleeve, and the shaft may be configured to limit movement of the sleeve. A second bracket may be configured to mount to the second end of the main tube.

20 Claims, 3 Drawing Sheets

U.S. PATENT DOCUMENTS

| | | | |
|---|---|---|---|
| 5,904,183 A | 5/1999 | Leech | |
| 5,947,156 A * | 9/1999 | Tomczyk | 137/899 |
| 5,971,438 A * | 10/1999 | Johnson | 285/253 |
| 6,003,819 A * | 12/1999 | Hall | 248/49 |
| 6,123,367 A * | 9/2000 | Miller | 285/181 |
| 6,802,343 B2 | 10/2004 | Faahs | |
| 7,036,524 B2 | 5/2006 | Kennedy | |
| 2007/0235096 A1 | 10/2007 | Nielsen | |

* cited by examiner

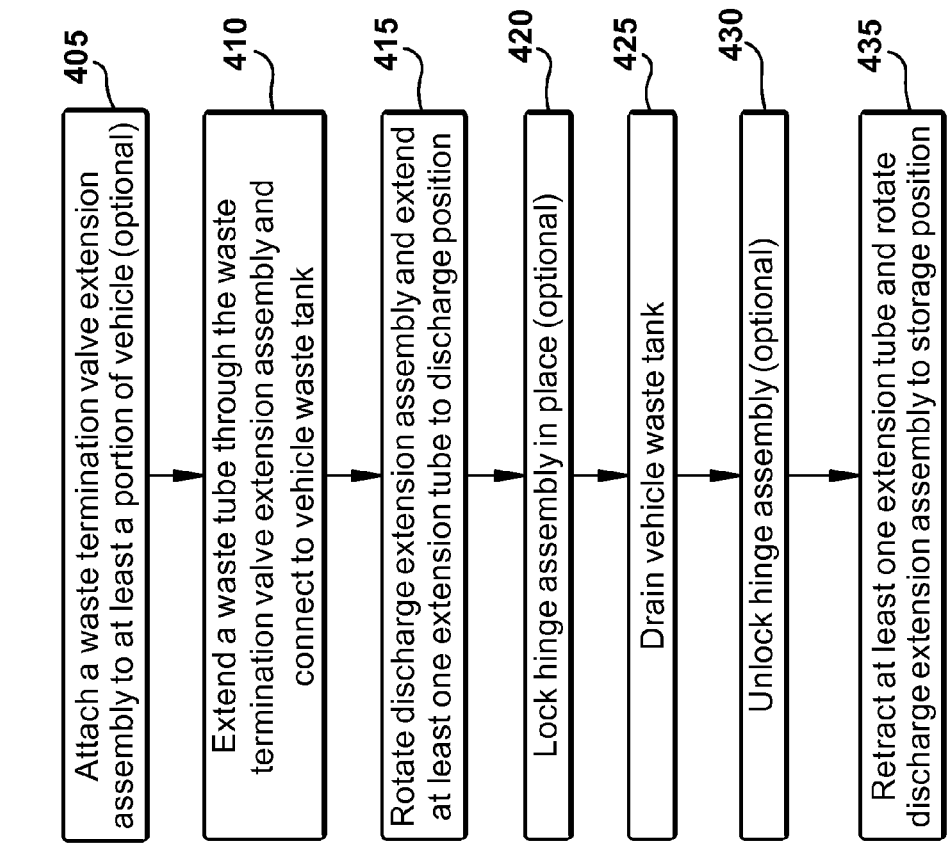
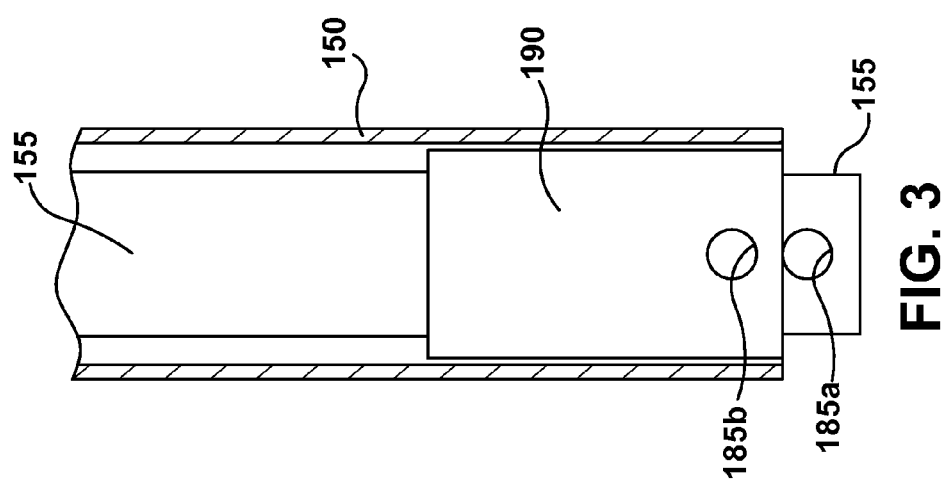

TERMINATION VALVE EXTENSION

CROSS-REFERENCE TO RELATED APPLICATIONS

This application claims priority to U.S. provisional patent application No. 61/265,353, filed Nov. 30, 2009, the disclosure of which is incorporated by reference herein in its entirety.

BACKGROUND

There are apparatuses and methods to facilitate the discharge of a waste holding tank, particularly for waste holding tanks in passenger vehicles.

Discharging a vehicle waste holding tank into a dump station can be a difficult and less-than-desirable task as it may require a person to touch hard to control components connected to the waste holding tank. For example, a hard to control flexible hose and a waste discharge valve connected to the vehicle waste holding tank need to be manipulated to discharge the waste tank into the dump station or a waste disposal system. Although the hose is flexible, it may be hard to control once loaded with waste material.

SUMMARY

The present invention relates to a termination valve extension assembly and method to facilitate the discharge of a vehicle waste holding tank.

In one embodiment, a discharge extension assembly has a main tube that has at least two ends, including a first end and a second end. The discharge extension assembly may further include at least one extension tube configured to telescope from within the main tube, with the main tube and the at least one extension tube including a plurality of collars that are configured to limit overextension of the at least one extension tube from the main tube.

Further, a first bracket may be configured to mount to the first end of the main tube and a hinge assembly may be configured to pivot the main tube and the at least one extension tube. The hinge assembly may further include a stop and a sleeve slidably engaged with a shaft, with the stop, the sleeve, and the shaft configured to limit movement of the sleeve. Also, a second bracket may be configured to mount to the second end of the main tube, wherein the second bracket includes a securing mechanism. The discharge extension assembly may also include a plurality of mounting assemblies.

BRIEF DESCRIPTION OF THE DRAWINGS

FIG. 3 is a cross-sectional view taken along line 3-3 in FIG. 2.

FIG. 4 is a flow chart illustrating one embodiment of a method of using a waste termination valve extension assembly.

DETAILED DESCRIPTION

It must be understood that while the following description may refer to certain waste termination valve extension assemblies, the following disclosure is applicable to various waste termination valve extension assemblies and methods in various types of vehicles and moveable structures. For example, the disclosure may be applied to automobiles, trucks, recreational vehicles, mobile homes, and the like. In at least one embodiment, the waste termination valve extension assemblies and methods described below control and direct at least one flexible hose configured to extend from a waste holding tank, or any associated outlet or valve, to a waste disposal dump station or waste apparatus or system.

Figure 1:
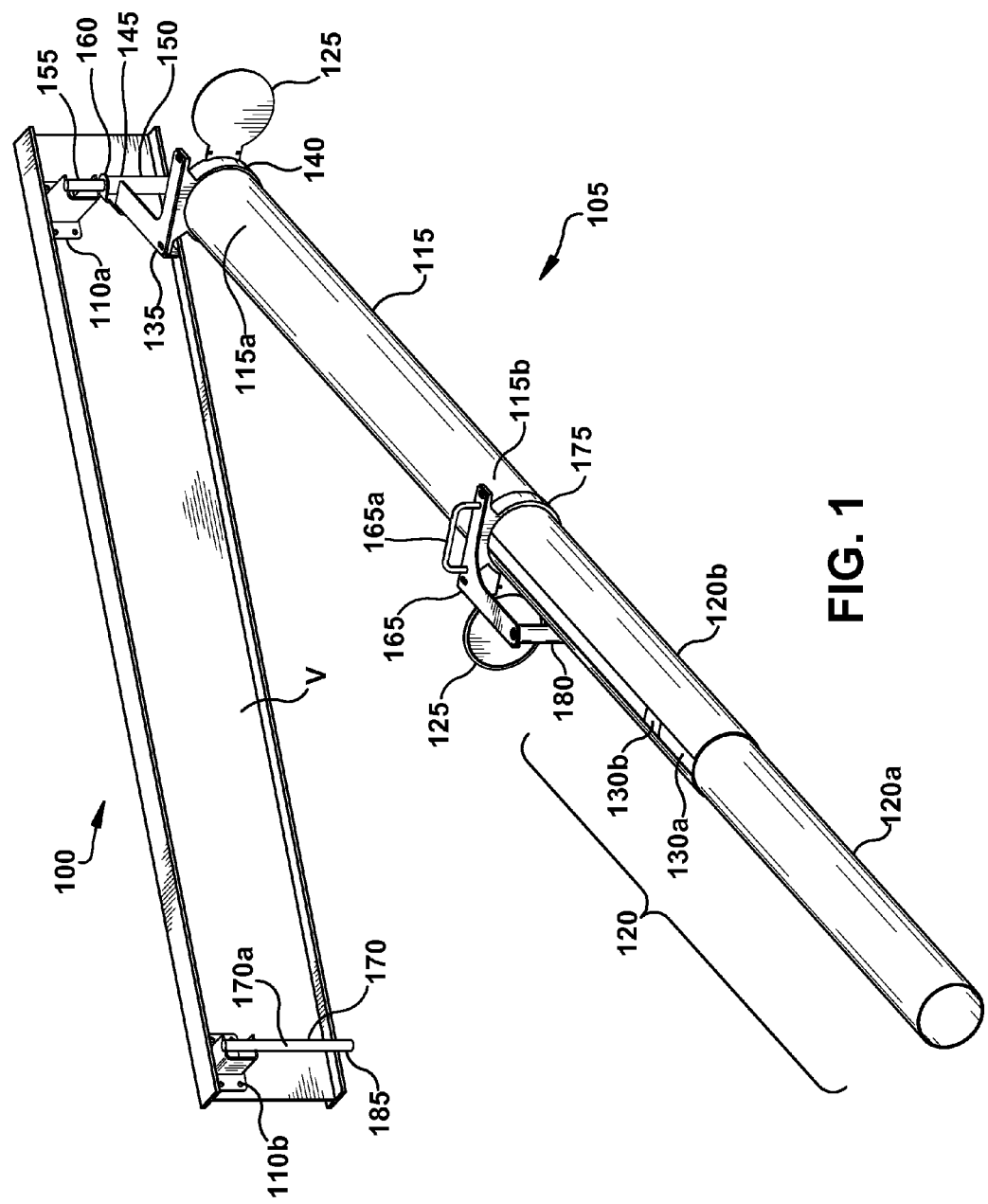
FIG. 1 illustrates a side perspective view of one embodiment of a waste termination valve extension assembly in a discharge position.

There is illustrated in FIG. 1 a waste termination valve extension assembly 100 in a discharge position. The waste termination valve extension assembly 100 includes a discharge extension assembly 105 and at least one mounting assembly 110a, 110b that connects to at least one portion of a vehicle V. The discharge extension assembly 105 is configured to receive, retain, and support at least one flexible waste discharge hose (not shown) and to control the direction of the waste flowing within the hose from the waste holding tank. For example, a recreational vehicle includes a waste holding tank that is emptied by connecting the discharge of the waste holding tank to the at least one flexible hose running through the discharge extension assembly 105 into a waste dumping destination.

Discharge extension assembly 105 includes a main tube 115 and at least one extension tube 120. Main tube 115 and at least one extension tube 120 have circular cross sections and are constructed of aluminum, steel, plastic, polyvinyl chloride, or other materials. In another embodiment (not shown), main tube 115 and at least one extension tube 120 have at least one of the following cross sections: square, rectangular, triangular, and the like. In any case, it must be understood that the main tube 115 and the at least one extension tube 120 may have any cross-section and be constructed of any material suitable for the discharge of waste from the vehicle V.

Main tube 115 includes a receiving end 115a, a discharge end 115b, and a plurality of caps 125 configured to attach and seal the ends of main tube 115. Retained within main tube 115 is at least one extension tube 120. In the illustrated embodiment, discharge extension assembly 105 includes a first extension tube 120a and a second extension tube 120b configured to extend and retract as a person moves the discharge extension assembly 105 between discharge and storage positions, respectively. In other words, first extension tube 120a and second extension tube 120b are configured to telescope from within main tube 115 (non-extended position illustrated in FIG. 2) to an extended position (illustrated in FIG. 1), and back to a non-extended position within main tube 115. For example, second extension tube 120b is configured to extend and retract from within main tube 115, and first extension tube 120a is configured to extend and retract from within second extension tube 120b. In another embodiment (not shown), discharge extension assembly 105 includes one extension tube or more than two extension tubes. In yet another embodiment (not shown), main tube 115 includes more than one tube configured to extend and retract. In any case, it must be understood that the discharge extension assembly 105 may include a main tube 115 and any number of extension tubes 120 as desired for the discharge of waste from the vehicle V.

Further illustrated in FIG. 1 are first collar 130a and second collar 130b configured to prevent overextension or disassembly of adjacent tubes. For example, first collar 130a is affixed to an end of second extension tube 120b and second collar 130b is affixed to an adjacent end of first extension tube 120a, such that first collar 130a and second collar 130b engage each other to prevent overextension of first extension tube 120a.

Further, a first collar (not shown) is affixed to an end of main tube 115 and a second collar (not shown) is affixed to an adjacent end of second extension tube 120b, such that first collar and second collar engage each other to prevent over-extension of second extension tube 120b. In another embodiment (not shown), adjacent tubes are configured to engage each other by using other components known that allow movement between adjacent tubes for a specific and limited distance, for example, slots, apertures, springs, and pins configured to allow limited movement. In any case, it must be understood that the extension tubes 120 may be joined by any suitable mechanism to retain the extension tubes 120 together and allow them to transition between the retracted and extended positions.

Figure 2:
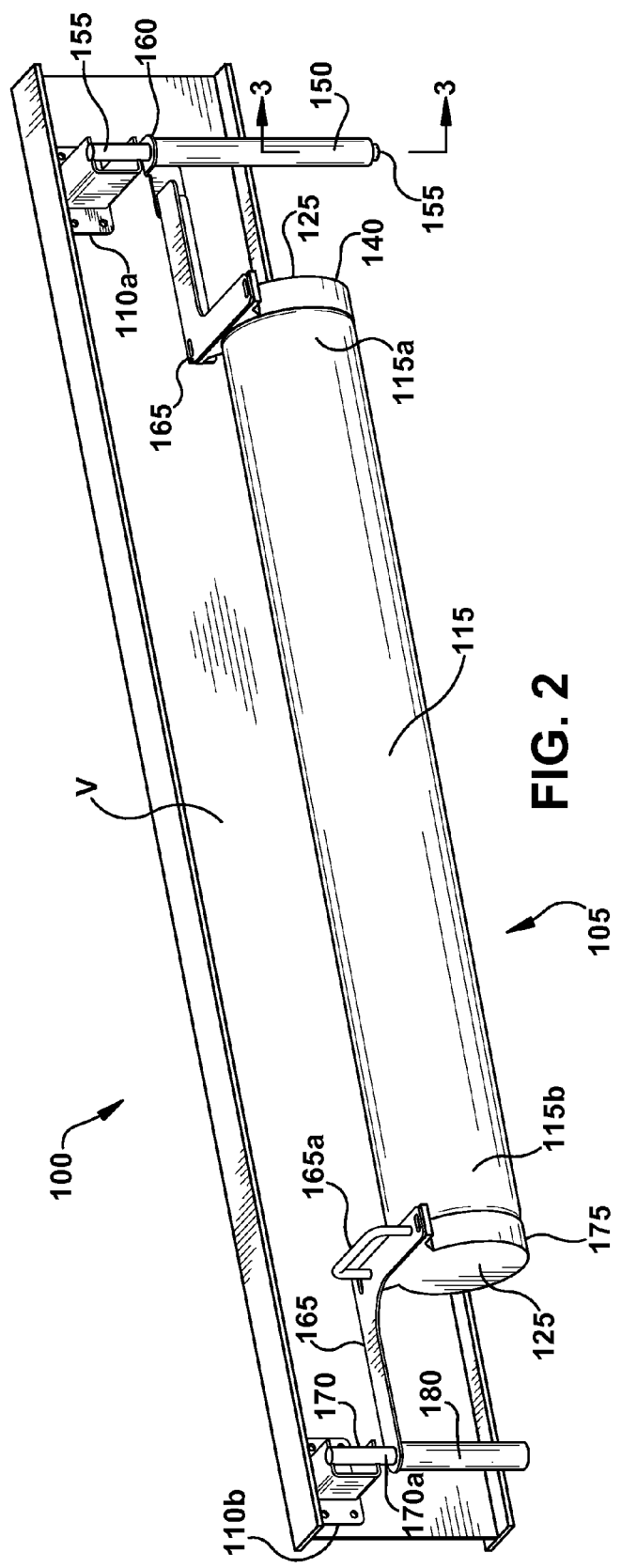
FIG. 2 illustrates a side perspective view of the waste termination valve extension assembly illustrated in FIG. 1 in a storage position.

Further illustrated in FIG. 1 is a first bracket 135 adapted to pivot discharge extension assembly 105 between a discharge position, illustrated in FIG. 1, and a stored position, illustrated in FIG. 2. For example, first bracket 135 pivots discharge extension assembly 105 from a stored horizontal position to a vertically sloping discharge position. First bracket 135 includes a first main tube portion 140 configured as a strap attached to receiving end 115a of main tube 115. For example, first main tube portion 140 is bolted, welded, or riveted to receiving end 115a. In another embodiment (not shown), first main tube portion 140 is attached to another portion of main tube 115. In yet another embodiment (not shown), first main tube portion 140 is attached to at least two portions of main tube 115. It must be understood however that the first main tube portion 140 may be attached to any other portion of the discharge extension assembly 105 in any manner suitable to maintain attachment during use of the discharge extension assembly 105.

In the illustrated embodiment, first bracket 135 is further attached to a hinge assembly 145 that includes a sleeve 150 adapted to rotate and slide along a shaft 155. The shaft 155 includes a stop 160 that limits the translation of sleeve 150 along shaft 155 from a first height to a second height, for example, from a stored position to a discharge position. In the illustrated embodiment, the distance between the discharge position and storage position that hinge assembly 145 translates ranges up to 2-4 inches (5 centimeters to 10 centimeters). In another embodiment (not shown), the distance between the discharge position and storage position can be less than 2 inches (less than 5 centimeters) or greater than 4 inches (greater than 10 centimeters).

Also illustrated in FIG. 1, hinge assembly 145 is configured to mount to a first mounting structure 110a that is secured to a portion of vehicle V or some other transportable structure. In the illustrated embodiment, hinge assembly 145 is configured to attach to first mounting bracket 110a bolted to a vehicle V. In another embodiment (not shown), hinge assembly 145 is attached to first mounting bracket 110a mounted to a vehicle V by at least one of the following connecting techniques: welding, riveting, and the like. In another embodiment (not shown), hinge assembly 145 is configured to mount to a portion of a vehicle V or some other transportable structure.

Also illustrated in FIG. 1 is a second bracket 165 configured to secure the discharge end 115b of main tube 115 to a mounting structure 170 that includes a shaft 170a attached to a second mounting bracket 110b. Second bracket 165 includes a second main tube portion 175 configured to mount to discharge end 115b of main tube 115. Second bracket 165 includes a sleeve 180 and a handle 165a, wherein sleeve 180 slidably engages mounting structure 170. For example, sleeve 180 slidably engages a shaft 170a extending from mounting structure 170, wherein shaft 170a attaches to a second mounting bracket 110b mounted to vehicle V. Handle 165a is used to extend and retract at least one extension tube 120 with at least one waste hose disposed therein. Further, the handle 165a can be used to rotate hinge assembly 145.

In another embodiment, shaft 170a includes an aperture 185 that is configured to receive a locking pin so sleeve 180 and shaft 170a can be locked in place. In another embodiment, sleeve 180 secures to at least one mounting structure 110 by using other techniques known to one skilled in the art, for example, use of at least one hook, latch, and the like that securely holds sleeve 180.

The waste termination valve extension assembly 100, illustrated in FIG. 1, is shown in FIG. 2 in a storage position adjacent to vehicle V. In the illustrated embodiment, when in the storage position sleeve 180 engages shaft 170a extending from mounting structure 170, preventing the discharge extension assembly 105 from pivoting away from the vehicle V into a discharge position. In the illustrated embodiment, first extension tube (not shown) and second extension tube (not shown) are retracted inside main tube 115 and caps 125 are closed on receiving end 115a and discharge end 115b. The shaft 170a extending from mounting structure 170 and the second bracket 165 are configured to engage and disengage the discharge extension assembly 105. For example, shaft 170a has a length that enables a person to deflect the second bracket 165 so that shaft 170a can insert into an opening of sleeve 180. As discussed above, the shaft 170a can further include or can be replaced by a hook, latch, and the like that securely fastens the sleeve 180 to the second mounting bracket 110b.

FIG. 3 is a cross-sectional view of hinge assembly 145 along line 3-3 shown in FIG. 2. Cross-section 3-3 illustrates shaft 155 configured to slide inside sleeve 150 and a stop 190 configured to limit extent of the sliding between shaft 155 and sleeve 150. Further illustrated is a plurality of apertures 185, including a first aperture 185a in shaft 155 and a second aperture 185b in stop 190 configured to receive a pin (not shown), for example, a cotter or a bridge pin, to hold the hinge assembly 145 and the discharge extension assembly 105 in a fixed position. In another embodiment (not shown), first aperture 185a and second aperture 185b are aligned and held in place by a cotter pin to retain sleeve 150, shaft 155, and discharge extension assembly 105 at a desired discharge or storage height. In another embodiment (not shown), shaft 155, sleeve 150, and stop 190 include more apertures than what is illustrated in FIG. 3 so that hinge assembly 145 and discharge extension assembly 105 can be fixed at a variety of positions. In another embodiment (not shown), other types of components that are known to one of ordinary skill in the art can be employed in place of or in combination with stop 190 to limit translation between shaft 155 and sleeve 150. In any case, it must be understood that any suitable mechanism may be used to limit translation between shaft 155 and sleve 150, as desired.

FIG. 4 is a flow chart illustrating one embodiment of a method for using a waste termination valve extension assembly. As shown in FIG. 4, a waste termination valve extension assembly is attached to at least a portion of a vehicle at 405 (optional). A waste tube is extended through the waste termination valve extension assembly and connected to the vehicle waste tank at 410. At 415, the discharge extension assembly is rotated and the at least one extension tube is extended to a discharge position. The hinge assembly is locked into place at 420 (optional) and the vehicle waste tank is emptied at 425. If the hinge assembly was locked into place, it is unlocked at 430 (optional). At 435, the at least one extension tube is retracted and the discharge extension assembly is rotated to a storage position.

While principles and modes of operation have been explained and illustrated with regard to particular embodiments, it must be understood, however, that this may be practiced otherwise than as specifically explained and illustrated without departing from its spirit or scope.

What is claimed is:

1. A waste termination valve extension assembly for a vehicle comprising:
    a discharge extension assembly including
        at least one main tube having a receiving end and a discharge end; and
        at least one extension tube, including a first extension tube and a second extension tube, wherein the first extension tube and the second extension tube are configured to telescope from within the discharge end of the at least one main tube, and the first extension tube and the second extension tube include a plurality of collars configured to limit overextension of the at least one extension tube;
    a hinge assembly including a sleeve slidably engaged with a shaft and a stop that limits movement of the sleeve along the shaft between a plurality of positions;
    a first bracket configured to mount to the receiving end of the at least one main tube and to the hinge assembly;
    a first mounting assembly;
    a shaft extending from a second mounting assembly; and
    a second bracket configured to mount to the discharge end of the at least one tube, wherein the second bracket includes a sleeve,
    wherein the sleeve is configured to removably secure to the shaft extending from the second mounting assembly, and
    wherein the hinge assembly is configured to pivot the at least one main tube and the at least one extension tube between the plurality of positions.

2. The waste termination valve extension assembly of claim 1, wherein the at least one main tube includes a plurality of caps.

3. The waste termination valve extension assembly of claim 1, wherein the plurality of positions include at least a storage position and a discharge position.

4. The waste termination valve extension assembly of claim 1, wherein the first mounting assembly and the second mounting assembly are configured to mount to a portion of a vehicle.

5. The waste termination valve extension assembly of claim 4, wherein the vehicle is a recreation vehicle.

6. The waste termination valve extension assembly of claim 4, further comprising at least one flexible discharge hose, wherein the discharge extension assembly is configured to support the at least one flexible discharge hose, and the at least one flexible discharge hose is configured to connect to at least a vehicle waste tank.

7. The waste termination valve extension assembly of claim 1, wherein the plurality of collars include a first collar affixed to an end of the second extension tube and a second collar affixed to an adjacent end of the first extension tube.

8. The waste termination valve extension assembly of claim 1, wherein the hinge assembly is configured to pivot so that the first bracket translates up to about 10 centimeters.

9. A discharge extension assembly for a vehicle comprising:
    a main tube having a receiving end and a discharge end;
    at least one extension tube configured to telescope from within the discharge end of the main tube, wherein the main tube and the at least one extension tube include a plurality of collars that are configured to limit overextension of the at least one extension tube from the main tube;
    a hinge assembly configured to pivot the main tube and the at least one extension tube, wherein the hinge assembly includes a sleeve slidably engaged with a shaft, and wherein the sleeve and the shaft are configured to limit movement of the sleeve along the shaft between a plurality of positions;
    a first bracket configured to mount to the receiving end of the main tube and the hinge assembly;
    a first mounting assembly;
    a second mounting assembly that has a shaft; and
    a second bracket configured to mount to the discharge end of the main tube, wherein the second bracket includes a securing mechanism.

10. The discharge extension assembly of claim 9, wherein the hinge assembly further includes a stop, wherein the shaft and the stop include a plurality of apertures that are configured to receive a pin to hold the hinge assembly and the discharge extension assembly in a fixed position.

11. The discharge extension assembly of claim 9, wherein the plurality of positions include at least a discharge position.

12. The discharge extension assembly of claim 9, further comprising at least one flexible discharge hose, wherein the discharge extension assembly is configured to support the at least one flexible hose, and the at least one flexible discharge hose is configured to connect to a vehicle waste tank and to a waste disposal station.

13. The discharge extension assembly of claim 9, wherein the plurality of collars include a first collar affixed to an end of the at least one extension tube and a second collar affixed to an adjacent end of the main tube.

14. The discharge extension assembly of claim 9, wherein the hinge assembly is configured to pivot so that the first bracket translates between an upper position and a lower position, wherein the upper position and the lower position are spaced apart up to about 10 centimeters.

15. A discharge extension assembly comprising:
    a main tube having at least two ends, including a first end and a second end;
    at least one extension tube configured to telescope from within the main tube, wherein the main tube and the at least one extension tube include a plurality of collars that are configured to limit overextension of the at least one extension tube from the main tube;
    a first bracket configured to mount to the first end of the main tube and a hinge assembly configured to pivot the main tube and the at least one extension tube, wherein the hinge assembly includes a stop and a sleeve slidably engaged with a shaft, and wherein the stop, the sleeve, and the shaft are configured to limit movement of the sleeve;
    a second bracket configured to mount to the second end of the main tube, wherein the second bracket includes a securing mechanism; and
    a plurality of mounting assemblies.

16. The discharge extension assembly of claim 15, wherein the securing mechanism includes a sleeve configured to secure a shaft connected to at least one of the plurality of mounting assemblies.

17. The discharge extension assembly of claim 15, wherein the securing mechanism includes a hook configured to secure a shaft connected to at least one of the plurality of mounting assemblies.

18. The discharge extension assembly of claim 15, further comprising at least one flexible discharge hose, wherein the discharge extension assembly is configured to support the at least one flexible hose, and the at least one flexible discharge hose is configured to connect to at least a waste tank.

19. The discharge extension assembly of claim 15, wherein the plurality of collars include a first collar affixed to an end of the at least one extension tube and a second collar affixed to an adjacent end of the main tube.

20. The discharge extension assembly of claim 15, wherein the hinge assembly is configured to pivot so that the first bracket translates up to 10 centimeters.

* * * * *